United States Patent
Seo et al.

(10) Patent No.: US 11,535,907 B2
(45) Date of Patent: Dec. 27, 2022

(54) HOT ROLLED STEEL PLATE FOR ELECTRIC RESISTANCE WELDED STEEL PIPE HAVING EXCELLENT WELDABILITY, AND MANUFACTURING METHOD THEREOF

(71) Applicant: POSCO, Pohang-si (KR)

(72) Inventors: Seok-Jong Seo, Gwangyang-si (KR); Hyun-Taek Na, Gwangyang-si (KR)

(73) Assignee: POSCO CO., LTD, Pohang-si (KR)

( * ) Notice: Subject to any disclaimer, the term of this patent is extended or adjusted under 35 U.S.C. 154(b) by 318 days.

(21) Appl. No.: 16/467,792

(22) PCT Filed: Nov. 29, 2017

(86) PCT No.: PCT/KR2017/013848
§ 371 (c)(1),
(2) Date: Jun. 7, 2019

(87) PCT Pub. No.: WO2018/117466
PCT Pub. Date: Jun. 28, 2018

(65) Prior Publication Data
US 2019/0323103 A1    Oct. 24, 2019

(30) Foreign Application Priority Data
Dec. 19, 2016   (KR) .......................... 10-2016-0173504

(51) Int. Cl.
*C21D 9/46*     (2006.01)
*B21B 3/02*     (2006.01)
(Continued)

(52) U.S. Cl.
CPC ................. *C21D 9/46* (2013.01); *B21B 3/02* (2013.01); *B21B 37/74* (2013.01); *C21D 6/002* (2013.01);
(Continued)

(58) Field of Classification Search
None
See application file for complete search history.

(56) References Cited

U.S. PATENT DOCUMENTS

2007/0193665 A1   8/2007  Furuya et al.
2012/0018056 A1   1/2012  Nakagawa et al.
(Continued)

FOREIGN PATENT DOCUMENTS

CN   103160756    6/2013
CN   103276291    9/2013
(Continued)

OTHER PUBLICATIONS

International Search Report—PCT/KR2017/013848 dated Apr. 12, 2018.
(Continued)

*Primary Examiner* — Nicholas A Wang
*Assistant Examiner* — Jacob J Gusewelle
(74) *Attorney, Agent, or Firm* — Cantor Colburn LLP (57) ABSTRACT

Provided is a steel used for chassis parts, etc. of an automobile and, more specifically, to a hot rolled steel plate for an electric resistance welded steel pipe, which shows an excellent weldability in electric resistance welding, and a manufacturing method thereof.

6 Claims, 1 Drawing Sheet

(a)

(b)

(51) Int. Cl.

| | | |
|---|---|---|
| *B21B 37/74* | (2006.01) |
| *C21D 6/00* | (2006.01) |
| *C21D 8/02* | (2006.01) |
| *C22C 38/00* | (2006.01) |
| *C22C 38/02* | (2006.01) |
| *C22C 38/06* | (2006.01) |
| *C22C 38/24* | (2006.01) |
| *C22C 38/26* | (2006.01) |
| *C22C 38/28* | (2006.01) |
| *C22C 38/38* | (2006.01) |

(52) U.S. Cl.
CPC ............ *C21D 6/005* (2013.01); *C21D 6/008* (2013.01); *C21D 8/0205* (2013.01); *C21D 8/0263* (2013.01); *C22C 38/001* (2013.01); *C22C 38/002* (2013.01); *C22C 38/02* (2013.01); *C22C 38/06* (2013.01); *C22C 38/24* (2013.01); *C22C 38/26* (2013.01); *C22C 38/28* (2013.01); *C22C 38/38* (2013.01); *C21D 2211/002* (2013.01); *C21D 2211/005* (2013.01); *C21D 2211/008* (2013.01)

(56) References Cited

U.S. PATENT DOCUMENTS

| 2015/0292054 A1 | 10/2015 | Kami et al. |
| 2016/0032438 A1 | 2/2016 | Hirata et al. |
| 2017/0159149 A1 | 6/2017 | Toyoda et al. |

FOREIGN PATENT DOCUMENTS

| CN | 109154045 | | | 1/2019 | |
| JP | S57108241 | | | 7/1982 | |
| JP | 09041078 | | | 2/1997 | |
| JP | 2007177325 | | | 7/2007 | |
| JP | 2009057620 | | | 3/2009 | |
| JP | 2009270171 | | | 11/2009 | |
| JP | 2012172256 | | | 9/2012 | |
| JP | 2014189812 | | | 10/2014 | |
| KR | 1020070003918 | | | 1/2007 | |
| KR | 20130098497 | | | 9/2013 | |
| KR | 20130098497 | A | * | 9/2013 | |
| KR | 1020140138854 | | | 12/2014 | |
| KR | 20150007609 | A | * | 1/2015 | |
| KR | 1020150007609 | | | 1/2015 | |
| KR | 101630982 | | | 6/2016 | |
| KR | 1020160089316 | | | 7/2016 | |
| KR | 101686257 | | | 12/2016 | |
| WO | WO-02103073 | A2 | * | 12/2002 | ............... C23C 2/12 |
| WO | 2005087966 | | | 9/2005 | |
| WO | 2015181911 | | | 12/2015 | |

OTHER PUBLICATIONS

Chinese Office Action—Chinese Application No. 201780078397.8 dated Aug. 20, 2020, citing CN 109154045, CN 103160756, JP S57-108241, WO 2005/087966, CN 103276291, JP 2014-189812, JP 2007-177325, and JP 2009-057620.
Japanese Office Action—Japanese Application No. 2019-532779 dated Aug. 18, 2020, citing JP 2009-270171 and JP 2012-172256.
European Search Report—European Application No. 17885236.4, dated Aug. 28, 2019, citing KR 2013 0098497, WO 2015/181911 and KR 101 630 982.

* cited by examiner

HOT ROLLED STEEL PLATE FOR ELECTRIC RESISTANCE WELDED STEEL PIPE HAVING EXCELLENT WELDABILITY, AND MANUFACTURING METHOD THEREOF

TECHNICAL FIELD

The present disclosure relates to steel used for chassis parts, etc. of an automobile and, more specifically, to a hot rolled steel plate for an electric resistance welded steel pipe, exhibiting excellent weldability in electric resistance welding, and a manufacturing method thereof.

BACKGROUND ART

Recently, the automobile industry has increasingly been choosing high-strength steel materials capable of simultaneously securing fuel efficiency and collision safety at a relatively low cost in order to regulate fuel efficiency for preservation of global environments and to secure collision safety of passengers. Lightweightedness is being done not only in an automobile body but also in chassis parts.

Generally, required properties of steel materials for an automobile body may be strength and elongation for forming, spot weldability required for assembly, and the like.

Meanwhile, steel materials for chassis parts are required to have fatigue properties for securing arc weldability and durability of parts, to be applied when assembling parts, in addition to the strength and elongation required for forming due to characteristics of parts.

Particular, in parts such as coupled torsion beam axle (CTBA) among the chassis parts, a hollow pipe is formed and used to simultaneously secure rigidity and lightweightedness, and for additional lightweightedness, high strengthening of the material is also being performed.

As described above, since a material used as a pipe member generally manufactures a pipe by electric resistance welding, it is very important to have electric resistance weldability as well as roll formability of the material during piping and cold formability after piping. Therefore, it is very important to secure integrity of a weld zone during electric resistance welding as a property in which the material should possess. This is because most fractures are concentrated in a weld zone or a weld heat affected zone as compared with a base material due to transformation during forming of an electric resistance welded steel pipe.

In order to improve the roll formability during piping of a material, it is advantageous that a yield ratio of the material be as low as possible. When the material is a high-strength steel material, and when yield strength is high and the yield ratio becomes high, there is a problem that it becomes difficult to secure roundness because spring back may become severe during the roll forming.

In order to finally perform cold forming by using the pipe, it is necessary to secure elongation of a material. In order to satisfy this requirement, a steel material having a low yield ratio and excellent elongation is basically required. As a material capable of satisfying such characteristics, a low yield ratio type hot rolled steel plate, called as dual phase steel (DP steel) is representative.

A low yield ratio type hot rolled steel plate in the related art is usually a dual-phase composite steel of ferrite-martensite. The low yield ratio type hot rolled steel plate exhibits continuous yield behavior and low yield strength characteristics by glissile dislocation introduced at the time of martensite transformation and has excellent elongation characteristics. In order to secure such properties, in the related art, in order to stably secure a ferrite fraction at the time of cooling after hot rolling, a component system containing a large amount of Si in steel was controlled. However, when a pipe is manufactured by an electric resistance welding method, a large amount of Si oxides are formed in a molten zone, which causes a defect known as a penetrator in a weld zone. After the ferrite transformation, the ferrite is quenched to a martensite transformation starting temperature (Ms) or lower to obtain martensite. In this case, if a residual phase is composed only of pure martensite, there is a problem that a strength drop increases due to heat during welding. In particular, a hardness drop ($\Delta$Hv) of the weld heat affected zone exceeds 30.

Meanwhile, if a pure bainite phase is obtained by quenching to a bainite transformation starting temperature (Bs) or lower after ferrite transformation in order to reduce a hardness drop phenomenon as described above, the hardness drop may be reduced, but there is a problem that the yield strength increases and elongation decreases may occur.

DISCLOSURE

Technical Problem

An aspect of the present disclosure is to provide a hot rolled steel plate for an electric resistance welded steel pipe having excellent weldability, since the drop in the strength of the weld heat affected zone (HAZ) formed at the time of electric resistance welding is less than that of the strength of the base material, cracks do not occur in the weld zone and the weld heat affected zone even during expanding of a pipe after piping, and a manufacturing method thereof.

Technical Solution

According to an aspect of the present disclosure, a hot rolled steel plate for an electric resistance welded steel pipe having excellent weldability includes, by wt %, carbon (C): 0.05 to 0.14%, silicon (Si): 0.1 to 1.0%, manganese (Mn): 0.8 to 1.8%, phosphorus (P): 0.001 to 0.02%, sulfur (S): 0.001 to 0.01%, aluminum (Al): 0.1 to 0.3%, chromium (Cr): 0.3 to 1.0%, titanium (Ti): 0.01 to 0.05%, niobium (Nb): 0.025% or less, vanadium (V): 0.035% or less, nitrogen (N): 0.001 to 0.01%, and a balance of iron (Fe) and inevitable impurities, wherein the Mn and Si satisfy the following Relational Expression 1, a microstructure includes a mixture of martensite and bainite phases together with a ferrite phase as a matrix structure, satisfying the following Relational Expression 2.

$$4 < Mn/Si < 12 \qquad \text{[Relational Expression 1]}$$

(where, Mn and Si refer to a weight content of each element.)

$$SSG_{M+B}/(M+B+SSG_{M+B}) \geq 0.6 \qquad \text{[Relational Expression 2]}$$

(where, M refers to a martensite phase, B refers to a bainite phase, $SSG_{M+B}$ is a hard phase in which the B and M phases exist together in a single grain and the M phase exists around a grain boundary and the B phase exists in a central region. Each phase refers to an area fraction (%).)

According to another aspect of the present disclosure, a manufacturing method of a hot rolled steel plate for an electric resistance welded steel pipe having excellent weldability includes the steps of: reheating steel slab satisfying the above-described alloy composition and the Relational Expression 1 to a temperature within a range of 1180 to 1300° C.; finish hot rolling the reheated steel slab at a temperature equal to or higher than Ar3 to manufacture a hot rolled steel plate; first cooling the hot rolled steel plate to a temperature within a range of of 550 to 750° C. at a cooling rate of 20° C./s or higher; second cooling the hot rolled steel plate at a cooling rate of 0.05 to 2.0° C./s within a range satisfying the following Relational Expression 3 after the first cooling; third cooling the hot rolled steel plate at a cooling rate of 20° C./s or higher to a temperature within a range of room temperature to 400° C. after the second cooling; and coiling the hot rolled steel plate after the third cooling.

$$|t-ta| \leq 2 \quad \text{[Relational Expression 3]}$$

(where, ta=252+(109[C])+(10.2[Mn])+(22.81[Cr])−(3.46[Si])−(5.41[Al])−(0.87Temp)+(0.00068Temp^2), where t refers to a retention time (sec) of the second cooling (extreme slow cooling zone) and ta refers to a retention time (sec) of the second cooling (extreme slow cooling zone) for securing an optimal phase fraction, and Temp refers to an intermediate temperature of the second cooling (extreme slow cooling zone) and refers to a temperature between a second cooling starting point and a second cooling stop point. Each alloy component refers a weight content.)

According to another aspect of the present disclosure, an electric resistance welded steel pipe having excellent expandability manufactured by electric resistance welding of the above-described hot rolled steel plate, is provided.

Advantageous Effects

According to the present disclosure, it is possible to provide a hot rolled steel plate having excellent weldability, and it is possible not only to suppress defects in a weld zone during electric resistance welding of the hot rolled steel plate, but to also significantly reduce a decrease in hardness of a weld heat affected zone.

In addition, it is possible to secure excellent cold formability without cracks occurring in the weld zone, the weld heat affected zone, or the like during piping and expanding after welding.

BEST MODE FOR INVENTION

The present inventors have conducted intensive research to manufacture a hot rolled steel plate having a grade of 590 MPa having excellent cold formability, in which, since a yield ratio is controlled to be less than 0.8 and the roll forming may be easily performed for piping, not only the electric resistance weldability is excellent, but also the strength drop in the weld heat affected zone is small, thereby fractures do not occur in the weld zone and the weld heat affected zone during expanding after piping.

As a result, it has been confirmed that a hot rolled steel plate for an electric resistance welded steel pipe having high strength and excellent weldability may be provided by forming a microstructure favorable to the above-described properties, by optimizing an alloy composition and manufacturing conditions of the steel material, thereby completing the present disclosure.

Hereinafter, the present disclosure will be described in detail.

According to an aspect of the present disclosure, it is preferable that a hot rolled steel plate for an electric resistance welded steel pipe having excellent weldability includes, by wt %, carbon (C): 0.05 to 0.14%, silicon (Si): 0.1 to 1.0%, manganese (Mn): 0.8 to 1.8%, phosphorus (P): 0.001 to 0.02%, sulfur (S): 0.001 to 0.01%, aluminum (Al): 0.1 to 0.3%, chromium (Cr): 0.3 to 1.0%, titanium (Ti): 0.01 to 0.05%, niobium (Nb): 0.025% or less, vanadium (V): 0.035% or less, and nitrogen (N): 0.001 to 0.01%.

Hereinafter, the reason why the alloy composition of the hot rolled steel plate provided in the present disclosure is limited as described above will be described in detail. In this case, the content of each element is given in wt % unless otherwise specified.

C: 0.05 to 0.14%

Carbon (C) is the most economical and effective element for strengthening steel. If an addition amount of carbon (C) increases, a fraction of low temperature transformation phase such as bainite and martensite increases in complex structure steel composed of ferrite, bainite, and martensite, such that tensile strength is improved.

In the present disclosure, when the content of C is less than 0.05%, formation of the low temperature transformation phase during cooling after hot rolling is not easy and strength at a target level may not be secured. On the other hand, when the content thereof exceeds 0.14%, the strength excessively increases, and weldability, formability, and toughness may be deteriorated.

Therefore, in the present disclosure, it is preferable to control the content of C to be 0.05 to 0.14%. More preferably, the content of C is 0.07 to 0.13%.

Si: 0.1 to 1.0%

Silicon (Si) deoxidizes molten steel, has a solid solution strengthening effect, and has an effect of promoting ferrite transformation during cooling after hot rolling as a ferrite stabilizing element. Therefore, silicon (Si) is an element effective for increasing ferrite fraction constituting a matrix structure of ferrite, bainite, and martensite complex phase steel.

If the content of Si is less than 0.1%, an effect of stabilizing ferrite is small and it is difficult to form a matrix structure as a ferrite structure. On the other hand, if the content thereof exceeds 1.0%, red scale due to Si is formed on a surface of the steel plate during hot rolling, such that not only the surface quality of the steel plate becomes so deteriorated, ductility and electrical resistance weldability are also deteriorated.

Therefore, in the present disclosure, it is preferable to control the content of Si to 0.1 to 1.0%. More preferably, the content of Si is 0.15 to 0.80%.

Mn: 0.8 to 1.8%

Manganese (Mn) is an effective element for solid solution strengthening of steel similarly to Si, and manganese (Mn) increases hardenability of steel to facilitate formation of bainite or martensite phase during cooling after hot rolling.

However, if the content thereof is less than 0.8%, the above-described effect may not be sufficiently obtained. On the other hand, if the content thereof exceeds 1.8%, the transformation of ferrite is delayed excessively, and it is difficult to secure a proper fraction of the ferrite phase. In a continuous casting process, a segregation portion at a central region of thickness is greatly developed during casting slab, such that the electric resistance weldability of a final product may be deteriorated.

Therefore, in the present disclosure, it is preferable to control the content of Mn to 0.8 to 1.8%. More preferably, the content of Mn is 1.0 to 1.75%.

P: 0.001 to 0.02%

Phosphorus (P) is an impurity present in steel. If the content thereof exceeds 0.02%, ductility degradation due to micro segregation and impact characteristics of steel may be deteriorated. However, in order to manufacture steel by setting the content of P to be less than 0.001%, it takes a long time to perform a steelmaking operation, which results in a problem that productivity is greatly reduced.

Therefore, in the present disclosure, it is preferable that the content of P is controlled to 0.001 to 0.02%.

S: 0.001 to 0.01%

Sulfur (S) is an impurity present in steel. If the content thereof exceeds 0.01%, sulfur (S) combines with Mn, or the like, to form a non-metallic inclusion, thereby significantly lowering toughness of steel. However, in order to manufacture steel by setting the content of S to be less than 0.001%, it takes a long time to perform a steelmaking operation, which results in a problem that productivity is greatly reduced.

Therefore, in the present disclosure, it is preferable to control the content of S to be 0.001 to 0.01%.

Al: 0.1 to 0.3%

Aluminum (Al) is a component mainly added for deoxidation and is an element for forming a ferrite phase during cooling after hot rolling as a stabilizing element of ferrite.

If the content of Al is less than 0.1%, an addition effect is insufficient and it becomes difficult to secure ductility of the high strength steel material. If the content of Al exceeds 0.3%, defects may easily occur in a slab during continuous casting and surface quality is deteriorated due to occurrence of surface defects after hot rolling. Therefore, it is preferable to limit the content thereof to 0.1 to 0.3%.

Cr: 0.3 to 1.0%

Chromium (Cr) performs solid solution strengthening of steel, and delay ferrite phase transformation during cooling as in the case of Mn, to facilitate to form martensite.

If the content of Cr is less than 0.3%, the above-described effect may not be sufficiently obtained. On the other hand, if the content thereof exceeds 1.0%, ferrite transformation is excessively delayed, fraction of a low temperature transformation phase such as bainite or martensite phase may be increased more than necessary, and elongation may be drastically deteriorated.

Therefore, in the present disclosure, it is preferable to control the content of Cr to 0.3 to 1.0%.

Ti: 0.01 to 0.05%

Titanium (Ti) forms coarse precipitates by combining with nitrogen (N) during continuous casting, and a portion thereof remain without being resolved in the material during reheating for hot rolling. The precipitates which are not resolved have a high melting point, even during welding, and the precipitates are not resolved, such that they serve to suppress a grain growth of the weld heat affected zone. In addition, the resolved Ti during reheating is finely precipitated during the phase transformation process during the cooling process after the hot rolling, thereby greatly improving the strength of steel.

In order to sufficiently obtain the above-described effect, it is preferable that the content of Ti be included in an amount of 0.01% or more. However, if the content thereof exceeds 0.05%, a yield ratio of steel is increased due to the precipitates finely precipitated, which makes roll forming during piping difficult.

Therefore, in the present disclosure, it is preferable to the content of Ti to 0.01 to 0.05%.

Nb: 0.025% or less (excluding 0%)

Niobium (Nb) is an element serving to improve strength by forming precipitates in a form of carbonitrides. In particular, precipitates, finely precipitated during the phase transformation process during the cooling process after the hot rolling greatly improve the strength of steel.

If the content of Nb exceeds 0.025%, a yield ratio of steel is greatly increased to make the roll forming during piping difficult, which is not preferable. Therefore, in the present disclosure, it is preferable to control the content of Nb to 0.025% or less, excluding 0%.

V: 0.035% or less (excluding 0%)

Vanadium (V) is an element serving to increasing strength by forming precipitates in a form of carbonitrides. In particular, precipitates, finely precipitated during the phase transformation process during the cooling process after the hot rolling greatly improve the strength of steel If the content of V exceeds 0.035%, a yield ratio of steel is greatly increased to make the roll forming during piping difficult, which is not preferable. Therefore, in the present disclosure, it is preferable to control the content of V to 0.035% or less, excluding 0%.

N: 0.001 to 0.01%

Nitrogen (N) is a representative solid solution strengthening element together with C, and coarse precipitates are formed together with Ti, Al, and the like.

In general, a solid solution strengthening effect of N is superior to that of C, but as an amount of N in steel increases, toughness may be greatly reduced. Therefore, it is preferable that an upper limit of N is limited to 0.01%. However, in order to manufacture steel by setting the content of N to be less than 0.001%, it takes a long time to perform a steelmaking operation, which results in a problem that productivity is greatly reduced.

Therefore, in the present disclosure, it is preferable to control the content of N to 0.001 to 0.01%.

In the present disclosure, it is preferable that manganese (Mn) and silicon (Si) satisfy the following Relational Expression 1.

$$4<Mn/Si<12$$ [Relational Expression 1]

(where, Mn and Si refer to a weight content of each element.)

When a value of the Relational Expression 1 is 4 or less or 12 or more, an incidence of penetrator defects in a weld zone is increased during manufacturing an electric resistance welded steel pipe, which is not preferable. This is because a probability that oxides remain in the weld zone during a process of compressing and discharging by increasing a melting point of the oxides generated in a molten zone during manufacturing the electric resistance welded steel pipe.

Therefore, in the present disclosure, it is preferable to satisfy the above-described content ranges, and satisfy the Relational Expression 1.

In the present disclosure, the remainder thereof may be iron (Fe). However, in a common manufacturing process, unintended impurities may be inevitably incorporated from raw materials or surrounding environments, such that they may not be included. These impurities are commonly known to a person skilled in the art, and are thus not specifically mentioned in this specification.

It is preferable that a microstructure of the hot rolled steel plate of the present disclosure satisfying the above-described alloy composition and the Relational Expression 1 includes a mixture of martensite and bainite phases together with a ferrite phase as a matrix structure.

In this case, it is preferable that the ferrite phase is included in an area fraction of 60 to 85%. If the fraction of the ferrite phase is less than 60%, elongation of steel may drop sharply, on the other hand, if the fraction of the ferrite phase exceeds 85%, the fraction of the low temperature phase (bainite and martensite) relatively decreases, and the desired strength may not be secured.

In the present disclosure, it is preferable to further include a hard phase in which bainite and martensite exist together in addition to each of the bainite and martensite phases.

Figure 1:
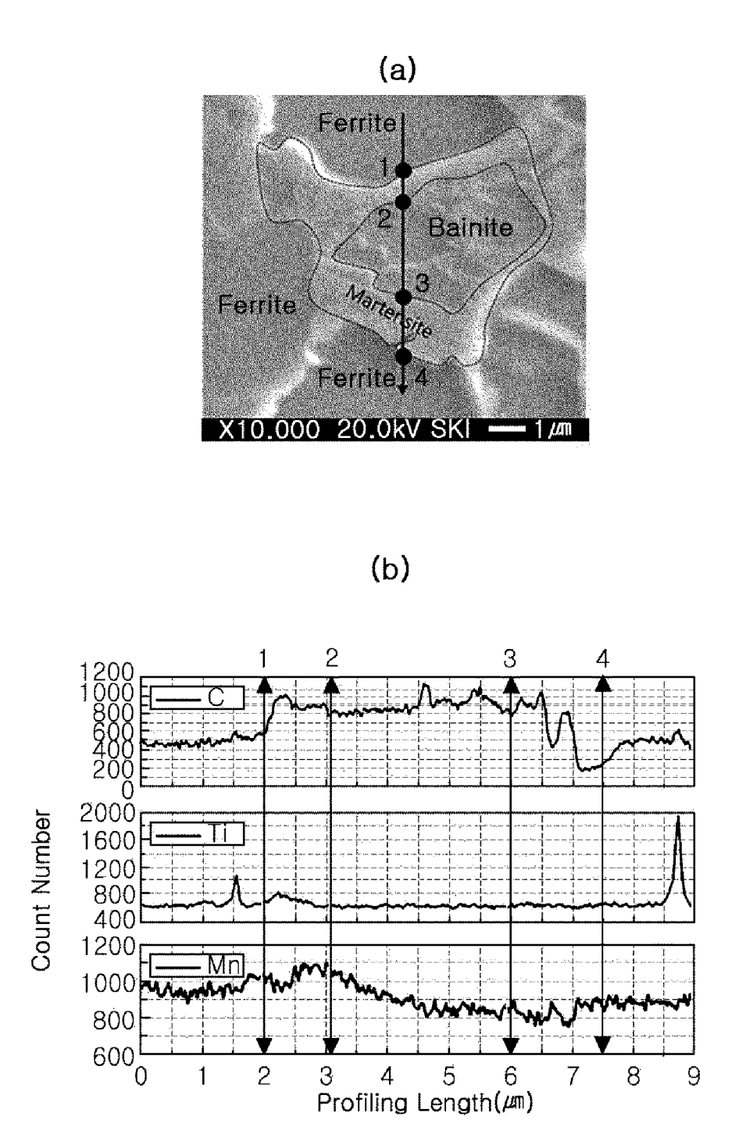
FIG. 1 illustrates a photograph (a) obtained by observing a shape of a $SSG_{M+B}$ structure according to an embodiment of the present disclosure using an electro probe X-ray micro analyzer (EPMA) and a measurement result (b) of a content of an alloy element of each section of the $SSG_{M+B}$ structure.

Specifically, as illustrated in FIG. 1A, as a structure phase in which a martensite phase exists around a grain boundary, and a bainite phase exists in a central region, in the present disclosure, the structure phase is defined as $SSG_{M+B}$.

As described above, in the present disclosure, by forming a phase ($SSG_{M+B}$) in which the martensite phase and the bainite phase exist together, expandability of the manufactured electrical resistance steel pipe may be improved by significantly reducing the hardness drop of the weld heat affected zone during electrical resistance welding.

However, it is preferable that the fractions of $SSG_{M+B}$ and bainite and martensite phases satisfy the following Relational Expression 2.

$$SSG_{M+B}/(M+B+SSG_{M+B}) \geq 0.6 \quad \text{[Relational Expression 2]}$$

(where, M refers to a martensite phase, B refers to a bainite phase, $SSG_{M+B}$ refers to a hard phase in which the B phase and the M phase exist together in a single grain (prior austenite), that is, refers to a structure in which a M phase exists around a grain boundary and a B phase exists in a central region. Each of the phases refers to an area fraction (%).)

If a fractional relationship between hard phases expressed by the above-described Relational Expression 2 is less than 0.6, the fraction of the phase ($SSG_{M+B}$) in which the bainite phase and the martensite phase exist together decreases and the hardness drop of the weld heat affected zone formed during the electrical resistance welding may be increased.

As described above, the hot rolled steel plate of the present disclosure, satisfying all the alloy composition, the Relational Expression 1 and the microstructure has a tensile strength of 590 MPa or more and has a yield ratio (YR=YS/TS) of 0.8 or less, and a Vikers hardness difference (ΔHv) between the weld heat affected zone formed at the time of electric resistance welding and base material may be obtained to be 30 or less.

Hereinafter, a manufacturing method of a hot rolled steel plate for an electric resistance welded pipe having excellent weldability provided by another aspect of the present disclosure will be described in detail.

Briefly, according to the present disclosure, a desired hot rolled steel plate may be manufactured through processes of [Reheating steel slab—Hot rolling—First cooling—Second cooling—Third cooling—Coiling], and conditions of each step will be described in detail below.

[Reheating Step]

First, it is preferable to prepare steel slab satisfying the above-described alloy composition and the Relational Expression 1 and then reheating the steel slab to a temperature of 1180 to 1300° C.

If the reheating temperature is less than 1180° C., aging heat of the slab is insufficient and it is difficult to secure a temperature during subsequent hot rolling, and it is difficult to eliminate the segregation generated during continuous casting. In addition, since precipitates precipitated at the time continuous casting may not be sufficiently resolved, and it is difficult to obtain a precipitation strengthening effect in a process after hot rolling. On the other hand, if the temperature exceeds 1300° C., the strength may be lowered due to an abnormal grain growth of austenite grains, and structural ununiform may be promoted.

Therefore, in the present disclosure, it is preferable that the steel slab is reheated at a temperature of 1180 to 1300° C.

[Hot Rolling Step]

It is preferable to perform hot rolling the reheated steel slab to manufacture a hot rolled steel plate. In this case, it is preferable that a finish hot rolling is performed at Ar3 (ferrite phase transformation starting temperature) or higher.

If the temperature when the finish hot rolling is performed is less than Ar3, rolling is performed after the ferrite transformation, such that it is difficult to secure desired structure and properties. On the other hand, if the temperature exceeds 1000° C. to perform the finish rolling, scaling defects may be increased on the surface.

Therefore, in the present disclosure, it is preferable that the finish hot rolling is performed in a temperature range satisfying Ar3 to 1000° C.

[First Cooling Step]

It is preferable to cool the hot rolled steel plate obtained by the above-described hot rolling, and in this case, it is preferable that cooling is performed stepwise.

First, it is preferable to perform first cooling at a cooling rate of 20° C./s or higher to a temperature within a range of 550 to 750° C.

If a temperature at which the first cooling is terminated is less than 550° C., a microstructure in steel mainly includes a bainite phase, such that a ferrite phase may not be obtained as a matrix structure. On the other hand, if the temperature exceeds 750° C., coarse ferrite and pearlite structures are formed and desired properties may not be obtained.

In addition, when cooling is performed at a cooling rate of less than 20° C./s during cooling to the above-described temperature range, ferrite and pearlite phase transformation occur during cooling, such that a hard phase may not be secured to a desired level. An upper limit of the cooling rate is not particularly limited and may be appropriately selected in consideration of cooling facilities.

[Second Cooling Step]

It is preferable that the hot rolled steel plate in which the first cooling is completed is second-cooled (extreme slow cooling) under specific conditions. More specifically, it is preferable to cool very slowly at a cooling rate of 0.05 to 20° C./s within a range satisfying the following Relational Expression 3.

$$|t-ta| \leq 2 \quad \text{[Relational Expression 3]}$$

(ta=252+(109[C])+(10.2[Mn])+(22.81[Cr])−(3.46[Si])−(5.41[A1])−(0.87Temp)+(0.00068Temp^2), where t refers to a retention time (sec) of the second cooling (extreme slow cooling zone), ta refers to a retention time (sec) of the second cooling (extreme slow cooling zone) for securing an optimal phase fraction, temp refers to an intermediate temperature of the second cooling (extreme slow cooling zone), that is a temperature at a midpoint between a second cooling starting point and stop point. Each alloy component refers to a weight content.)

The above-described Relational Expression 3 is for obtaining the microstructure proposed in the present disclosure, specifically, the microstructure satisfying the above-described Relational Expression 2. In particular, by optimizing an intermediate temperature (Temp) in the extreme slow cooling zone and a retention time in the extreme slow cooling zone, it is possible to secure that a fraction ratio of the bainite phase B, the martensite phase M, and the phase ($SSG_{M+B}$) in which bainite and martensite exist together in one crystal grain satisfies the Relational Expression 2.

If the second cooling is performed out of the condition of the Relational Expression 3, the fraction of the phase ($SSG_{M+B}$) in which bainite and martensite exist together in one crystal grain may be remarkably reduced, and the phase fraction composed of only the bainite phase B or the martensite phase M may be increased. As described above, if the second phase except for the ferrite phase as the matrix structure is formed of only the bainite phase B, the yield ratio increases. If the second phase is formed of only the martensite phase M, the yield ratio is reduced, which is advantageous for roll forming at the time of piping, but a problem in which the hardness drop of the weld heat affected zone becomes large at the time of electric resistance welding occurs.

As illustrated in FIG. 1, when the ferrite phase transformation from austenite occurs during the first cooling or the retention time of the extreme slow cooling zone (second cooling), diffusion of carbon into the residual austenite occurs, but by controlling the intermediate temperature and the retention time of the extreme slow cooling zone, only the carbon concentration in a portion adjacent to the ferrite increases sharply. In this state, when post cooling is started, a portion thereof is transformed into bainite and a portion thereof is transformed into martensite due to the difference in the carbon concentration to satisfy the Relational Expression 2.

However, if the Relational Expression 3 is not satisfied during the second cooling, the carbon concentration becomes uniform such that it is transformed into the bainite phase B or the martensite phase M, which is not preferable.

In addition, if the cooling rate in the second cooling exceeds 2.0° C./s in a rapid cooling zone, the fraction of the bainite phase B increases and an intended microstructure may not be formed. On the other hand, it is difficult to realize a cooling rate of less than 0.05° C./s through temperature control in a form of heat retaining or heating in a rapid cooling zone. Therefore, it is preferable to control the cooling rate to 0.05° C./s or more, 2.0° C./s or less.

[Third Cooling]

It is preferable to perform a third cooling at a cooling rate of 20° C./s or more to a temperature within a range of room temperature to 400° C. after completing the second cooling in the extreme slow cooling zone. Here, room temperature refers to a range of about 15 to 35° C.

If a temperature at which the third cooling is terminated exceeds 400° C., and thus it is Ms (matrensite transformation temperature) or more, most of a remaining untransformed transformation phase is transformed into the bainite phase and the microstructure satisfying the Relational Expression 2 of the present disclosure may not be obtained.

In addition, if the cooling rate during the third cooling is less than 20° C./s, the bainite phase is excessively formed and thus desired properties and microstructures of the present disclosure may not be obtained. An upper limit of the cooling rate is not particularly limited, and may be appropriately selected in consideration of cooling facilities.

[Coiling Step]

It is preferable to perform a process of coiling the hot rolled steel plate which has been subjected to the third cooling at the temperature, as described above.

Meanwhile, in the present disclosure a step of natural cooling the coiled hot rolled steel plate to a temperature within a range of room temperature to 200° C., pickling the coiled hot rolled steel plate to descale surface layer region, and then greasing, may further be included. In this case, if the temperature of the steel plate exceeds 200° C., the surface layer region of the hot rolled steel plate may be over-pickled and roughness of the surface layer region may be worsened.

The present disclosure provides an electric resistance welded steel pipe by electric resistance welding the hot rolled steel plate manufactured according to the steps as above, and the electric resistance welded steel pipe has an excellent effect of expandability.

Hereinafter, the present disclosure will be described more specifically through examples. However, the following examples should be considered in a descriptive sense only and not for purposes of limitation. The scope of the present invention is defined by the appended claims, and modifications and variations may be reasonably made therefrom.

MODE FOR INVENTION

Embodiment

Steel slabs having the alloy composition shown in the following Table 1 were prepared, and then the steel slabs were heated to a temperature of 1250° C., followed by finish hot rolling in a range of 860±20° C. to manufacture a hot rolled steel plate having a thickness of 3 mmt. Thereafter, first cooling (indicated by a cooling stop temperature in Table 2) was performed at a cooling rate of 80° C./s to a temperature of 550 to 750° C., control cooling (second cooling) at an intermediate temperature and a retention time in the extreme slow cooling zone shown in the following Table 2 was performed, and third cooling was performed at a cooling rate of 60° C./s to room temperature, and then coiled.

With respect to each of the hot rolled steel plates manufactured as described above, JIS5 specimens were prepared and a tensile test at room temperature at a transformation rate of 10 mm/min was conducted.

Microstructures of each of the hot rolled steel plate were measured using an image analyzer after capturing SEM images at magnifications of 3000 times, area fractions of each of the phases (ferrite (F), martensite (M), and bainite (B)) were measured. The $SSG_{M+B}$ in the structure phase was classified by measuring distribution of C and Mn by using a line scanning method of EPMA for dual phases observed on the SEM phase. The area fraction (area %) thereof was calculated by using an image analyzer.

A coiled hot rolled coil was slit and piping was performed by an electric resistance welding method to manufacture a pipe having a diameter of 90 mm. In this case, the piping was subjected to a heat input of 140 to 200 Kw, a line speed of 20 to 30 m/min, and an upset amount of 0.8 to 1.2.

A softening behavior of the weld zone of the pipe manufactured after the above-mentioned pipe making was calculated by measuring the hardness distribution at intervals of 0.1 mm with a load of 2.941N (300 g) using a Vickers hardness tester.

The results thus measured were shown in the following Table 3.

TABLE 1

| Steel type | Alloy composition (weight %) | | | | | | | | | | | Relational Expression 1 |
|---|---|---|---|---|---|---|---|---|---|---|---|---|
| | C | Si | Mn | P | S | Cr | Ti | Nb | V | Al | N | |
| Inventive Steel 1 | 0.09 | 0.25 | 1.42 | 0.02 | 0.003 | 0.5 | 0.01 | 0.01 | 0.01 | 0.12 | 0.004 | 5.7 |
| Inventive Steel 2 | 0.11 | 0.25 | 1.03 | 0.02 | 0.003 | 0.7 | 0.01 | 0.01 | 0.01 | 0.10 | 0.004 | 4.1 |
| Inventive Steel 3 | 0.13 | 0.25 | 1.51 | 0.01 | 0.003 | 0.3 | 0.01 | 0.01 | 0.01 | 0.10 | 0.003 | 6.0 |
| Inventive Steel 4 | 0.09 | 0.15 | 1.13 | 0.01 | 0.004 | 0.5 | 0.01 | 0.01 | 0.01 | 0.12 | 0.003 | 7.5 |
| Inventive Steel 5 | 0.09 | 0.41 | 1.72 | 0.01 | 0.004 | 0.5 | 0.01 | 0.01 | 0.01 | 0.11 | 0.004 | 4.2 |
| Inventive Steel 6 | 0.10 | 0.35 | 1.72 | 0.02 | 0.003 | 0.5 | 0.01 | 0.01 | 0.01 | 0.13 | 0.003 | 4.9 |
| Inventive Steel 7 | 0.07 | 0.25 | 1.21 | 0.01 | 0.003 | 0.7 | 0.01 | 0.01 | 0.01 | 0.19 | 0.005 | 4.8 |
| Inventive Steel 8 | 0.10 | 0.28 | 1.19 | 0.02 | 0.004 | 0.7 | 0.01 | 0.02 | 0.01 | 0.14 | 0.003 | 4.3 |
| Inventive Steel 9 | 0.10 | 0.29 | 1.25 | 0.02 | 0.005 | 0.7 | 0.04 | 0.01 | 0.01 | 0.22 | 0.004 | 4.3 |
| Inventive Steel 10 | 0.10 | 0.22 | 1.11 | 0.01 | 0.003 | 0.7 | 0.01 | 0.01 | 0.03 | 0.17 | 0.008 | 5.0 |
| Comparative Steel 1 | 0.19 | 0.25 | 1.42 | 0.01 | 0.003 | 0.5 | 0.03 | 0.01 | 0.01 | 0.19 | 0.003 | 5.7 |
| Comparative Steel 2 | 0.01 | 0.25 | 1.11 | 0.02 | 0.004 | 0.5 | 0.03 | 0.01 | 0.01 | 0.19 | 0.004 | 4.4 |
| Comparative Steel 3 | 0.09 | 2.11 | 1.42 | 0.01 | 0.003 | 0.5 | 0.03 | 0.01 | 0.01 | 0.14 | 0.009 | 0.7 |
| Comparative Steel 4 | 0.10 | 0.01 | 1.47 | 0.01 | 0.003 | 0.6 | 0.03 | 0.01 | 0.01 | 0.14 | 0.008 | 147 |
| Comparative Steel 5 | 0.09 | 0.21 | 2.33 | 0.02 | 0.005 | 0.5 | 0.03 | 0.01 | 0.01 | 0.12 | 0.004 | 11.1 |
| Comparative Steel 6 | 0.11 | 0.21 | 0.69 | 0.02 | 0.004 | 0.5 | 0.03 | 0.01 | 0.01 | 0.11 | 0.003 | 3.3 |
| Comparative Steel 7 | 0.09 | 0.22 | 1.42 | 0.01 | 0.003 | 1.52 | 0.03 | 0.01 | 0.01 | 0.10 | 0.003 | 6.5 |
| Comparative Steel 8 | 0.09 | 0.29 | 1.42 | 0.01 | 0.003 | 0.1 | 0.03 | 0.01 | 0.01 | 0.10 | 0.003 | 4.9 |
| Comparative Steel 9 | 0.06 | 0.39 | 1.69 | 0.01 | 0.003 | 0.4 | 0.09 | 0.01 | 0.01 | 0.12 | 0.004 | 4.3 |
| Comparative Steel 10 | 0.06 | 0.31 | 1.55 | 0.02 | 0.004 | 0.6 | 0.03 | 0.04 | 0.01 | 0.11 | 0.004 | 5.0 |
| Comparative Steel 11 | 0.06 | 0.25 | 1.42 | 0.03 | 0.003 | 0.5 | 0.03 | 0.01 | 0.07 | 0.11 | 0.003 | 5.7 |
| Inventive Steel 11 | 0.12 | 0.25 | 1.41 | 0.02 | 0.004 | 0.5 | 0.03 | 0.01 | 0.01 | 0.21 | 0.006 | 5.6 |
| Inventive Steel 12 | 0.12 | 0.22 | 1.39 | 0.02 | 0.004 | 0.5 | 0.03 | 0.01 | 0.01 | 0.20 | 0.005 | 6.3 |
| Inventive Steel 13 | 0.10 | 0.27 | 1.42 | 0.02 | 0.004 | 0.5 | 0.03 | 0.01 | 0.01 | 0.11 | 0.003 | 5.3 |
| Inventive Steel 14 | 0.10 | 0.25 | 1.33 | 0.02 | 0.003 | 0.5 | 0.03 | 0.01 | 0.01 | 0.19 | 0.004 | 5.3 |
| Inventive Steel 15 | 0.09 | 0.25 | 1.11 | 0.02 | 0.003 | 0.7 | 0.01 | 0.01 | 0.01 | 0.10 | 0.004 | 4.4 |

TABLE 2

| Steel Type | First cooling Cooling stop temperature (° C.) | Second cooling condition | | | Relational Expression 3 | | No. |
|---|---|---|---|---|---|---|---|
| | | Intermediate temperature (Temp) (° C.) | Retention time (t) (sec) | Cooling rate (° C./s) | ta (sec) | |t − ta| | |
| Inventive Steel 1 | 645 | 640 | 6 | 1.7 | 7.9 | 1.9 | Inventive Example 1 |
| Inventive Steel 2 | 605 | 600 | 10 | 1.0 | 11.9 | 1.9 | Inventive Example 2 |
| Inventive Steel 3 | 645 | 640 | 10 | 1.0 | 8.7 | 1.3 | Inventive Example 3 |
| Inventive Steel 4 | 625 | 620 | 6 | 1.7 | 5.6 | 0.4 | Inventive Example 4 |

TABLE 2-continued

| Steel Type | First cooling Cooling stop temperature (° C.) | Second cooling condition Intermediate temperature (Temp) (° C.) | Retention time (t) (sec) | Cooling rate (° C./s) | Relational Expression 3 ta (sec) | |t − ta| | No. |
|---|---|---|---|---|---|---|---|
| Inventive Steel 5 | 645 | 640 | 9 | 1.1 | 10.5 | 1.5 | Inventive Example 5 |
| Inventive Steel 6 | 625 | 620 | 10 | 1.0 | 11.9 | 1.9 | Inventive Example 6 |
| Inventive Steel 7 | 605 | 600 | 7 | 1.4 | 8.8 | 1.8 | Inventive Example 7 |
| Inventive Steel 8 | 610 | 600 | 11 | 1.8 | 12.1 | 1.1 | Inventive Example 8 |
| Inventive Steel 9 | 645 | 640 | 10 | 1.0 | 11.2 | 1.2 | Inventive Example 9 |
| Inventive Steel 10 | 605 | 600 | 10 | 1.0 | 11.3 | 1.3 | Inventive Example 10 |
| Comparative Steel 1 | 645 | 640 | 10 | 1.0 | 18.4 | 8.4 | Comparative Example 1 |
| Comparative Steel 2 | 645 | 640 | 6 | 1.7 | −4.3 | 10.3 | Comparative Example 2 |
| Comparative Steel 3 | 645 | 640 | 6 | 1.7 | 1.4 | 4.6 | Comparative Example 3 |
| Comparative Steel 4 | 645 | 640 | 6 | 1.7 | 12.5 | 6.5 | Comparative Example 4 |
| Comparative Steel 5 | 645 | 640 | 10 | 1.0 | 17.3 | 7.3 | Comparative Example 5 |
| Comparative Steel 6 | 645 | 640 | 6 | 1.7 | 2.8 | 3.2 | Comparative Example 6 |
| Comparative Steel 7 | 645 | 640 | 10 | 1.0 | 31.4 | 21.4 | Comparative Example 7 |
| Comparative Steel 8 | 605 | 600 | 6 | 1.7 | −0.2 | 6.2 | Comparative Example 8 |
| Comparative Steel 9 | 645 | 640 | 6 | 1.7 | 4.6 | 1.4 | Comparative Example 9 |
| Comparative Steel 10 | 645 | 640 | 6 | 1.7 | 8.1 | 2.1 | Comparative Example 10 |
| Comparative Steel 11 | 645 | 640 | 6 | 1.7 | 4.7 | 1.3 | Comparative Example 11 |
| Inventive Steel 11 | 650 | 640 | 15 | 1.3 | 10.6 | 4.4 | Comparative Example 12 |
| Inventive Steel 12 | 650 | 530 | 0 | 21.8 | 18.7 | 18.7 | Comparative Example 13 |
| Inventive Steel 13 | 790 | 785 | 8 | 1.3 | 23.3 | 15.3 | Comparative Example 14 |
| Inventive Steel 14 | 530 | 525 | 8 | 1.3 | 16.7 | 8.7 | Comparative Example 15 |
| Inventive Steel 15 | 620 | 600 | 10 | 4.0 | 10.5 | 0.5 | Comparative Example 16 |

TABLE 3

| No. | Microstructure (fraction) F | M | B | $SSG_{M+B}$ | Relational Expression 2 | Mechanical properties YS (MPa) | TS (MPa) | YR | El (%) | Welding behavior ΔHv (Hv) |
|---|---|---|---|---|---|---|---|---|---|---|
| Inventive Example 1 | 69 | 3 | 2 | 26 | 0.84 | 599 | 799 | 0.75 | 20 | 17 |
| Inventive Example 2 | 61 | 5 | 3 | 31 | 0.79 | 670 | 971 | 0.69 | 18 | 18 |
| Inventive Example 3 | 60 | 6 | 3 | 31 | 0.78 | 712 | 989 | 0.72 | 17 | 18 |
| Inventive Example 4 | 74 | 2 | 2 | 22 | 0.85 | 523 | 727 | 0.72 | 22 | 15 |
| Inventive Example 5 | 65 | 3 | 3 | 29 | 0.83 | 593 | 835 | 0.71 | 19 | 18 |
| Inventive Example 6 | 62 | 4 | 3 | 31 | 0.82 | 620 | 899 | 0.69 | 19 | 18 |
| Inventive Example 7 | 80 | 2 | 1 | 17 | 0.85 | 435 | 612 | 0.71 | 25 | 16 |

TABLE 3-continued

| | Microstructure (fraction) | | | Relational Expression 2 | Mechanical properties | | | | Welding behavior ΔHv (Hv) |
|---|---|---|---|---|---|---|---|---|---|
| No. | F | M | B | $SSG_{M+B}$ | | YS (MPa) | TS (MPa) | YR | El (%) | |
| Inventive Example 8 | 60 | 3 | 4 | 33 | 0.83 | 611 | 860 | 0.71 | 19 | 16 |
| Inventive Example 9 | 60 | 3 | 3 | 34 | 0.85 | 724 | 940 | 0.77 | 20 | 17 |
| Inventive Example 10 | 63 | 4 | 2 | 31 | 0.84 | 655 | 910 | 0.72 | 20 | 15 |
| Comparative Example 1 | 30 | 32 | 23 | 15 | 0.21 | 865 | 1201 | 0.72 | 16 | 48 |
| Comparative Example 2 | 88 | 2 | 10 | 0 | 0.00 | 257 | 422 | 0.61 | 42 | 35 |
| Comparative Example 3 | 95 | 2 | 2 | 1 | 0.20 | 469 | 679 | 0.69 | 25 | 46 |
| Comparative Example 4 | 60 | 2 | 28 | 10 | 0.60 | 471 | 699 | 0.67 | 19 | 47 |
| Comparative Example 5 | 52 | 10 | 26 | 12 | 0.25 | 634 | 975 | 0.65 | 18 | 53 |
| Comparative Example 6 | 97 | 0 | 2 | 1 | 0.33 | 269 | 456 | 0.59 | 25 | 30 |
| Comparative Example 7 | 60 | 6 | 19 | 15 | 0.38 | 619 | 910 | 0.68 | 19 | 60 |
| Comparative Example 8 | 92 | 2 | 6 | 0 | 0.00 | 579 | 878 | 0.66 | 22 | 49 |
| Comparative Example 9 | 63 | 3 | 4 | 30 | 0.81 | 766 | 833 | 0.92 | 19 | 25 |
| Comparative Example 10 | 63 | 3 | 3 | 31 | 0.83 | 614 | 683 | 0.90 | 28 | 24 |
| Comparative Example 11 | 65 | 4 | 2 | 29 | 0.82 | 621 | 691 | 0.90 | 29 | 22 |
| Comparative Example 12 | 41 | 18 | 39 | 2 | 0.20 | 606 | 841 | 0.72 | 19 | 39 |
| Comparative Example 13 | 25 | 20 | 53 | 2 | 0.03 | 768 | 962 | 0.80 | 12 | 50 |
| Comparative Example 14 | 70 | 13 | 16 | 1 | 0.03 | 611 | 899 | 0.68 | 18 | 43 |
| Comparative Example 15 | 60 | 10 | 27 | 3 | 0.03 | 604 | 875 | 0.69 | 18 | 41 |
| Comparative Example 16 | 61 | 3 | 30 | 6 | 0.15 | 645 | 889 | 0.73 | 18 | 43 |

(where, 'F' refers to a ferrite phase, 'M' refers to a martensite phase, and 'B' refers to a bainite phase in the Table 3 as above. YS refers to yield strength, TS refers to tensile strength, YR refers to a yield ratio (yield strength/tensile strength), and El refers to elongation.)

As shown in the Tables 1 to 3, Invention Examples 1 to 10 in which all of the alloy composition, component relationship, and manufacturing conditions satisfied things proposed in the present disclosure formed intended microstructure to obtain desired properties, and weldability may be excellently secured.

On the other hand, Comparative Examples 1 to 8 are cases in which the alloy composition deviates from the present disclosure.

In Comparative Examples 1 and 7, the contents of C and Cr were excessively added, it can be confirmed that ta values in the Relational Expression 3 were calculated to be 17 sec and 31 sec, respectively. That is, a retention time in the extreme slow cooling zone required for securing the optimal phase fraction, which exceeds a controllable retention time range in the extreme slow cooling zone (ROT section) of the present embodiment.

In addition, Comparative Examples 2 and 8 show the case the contents of C and Cr were not sufficiently added, and the value of ta in the Relational Expression 3 was indicated to be negative. Thus, it is difficult to form a low temperature transformation phase during cooling after hot rolling, such that no $SSG_{M+B}$ phase was formed.

Comparative Examples 3, 4, 5, and 6 show the case in which the contents of Si and Mn deviate from the present disclosure, as the value of the component relational expression (Relational Expression 1) between the Si and Mn deviates from an effective range, or the value of |t−ta| deviates from an effective range, when the above-described hot rolled steel plate is subject to electric resistance welding, there is a high possibility that the penetrate defects may occur at the weld zone, and cracks were easily generated at the weld zone during piping and pipe expanding. In particular, it can be confirmed that the difference in Vickers hardness between the weld heat affected zone and the base material after electric resistance welding is 30 Hv or more.

Comparative Examples 9 to 11 show that the case in which the content of precipitated elements such as Ti, Nb, and V deviated from the present disclosure. In these cases, it was possible to secure a sufficient fraction of the $SSG_{M+B}$ phase by satisfying the Relational Expression 1 and the Relational Expression 3. However, fine precipitates accompanied by phase transformation in the extreme slow cooling were formed in large quantities and the yield strength was excessively high such that the desired yield ratio was not obtained. In this case, a problem in which a spring back phenomenon becomes severe during roll forming, making it difficult to secure roundness occurs, and it becomes difficult to perform piping to make a pipe having excellent quality.

In Comparative Examples 12 to 16, ally compositions and Relational Expression 1 show steel types satisfying the present disclosure.

In Comparative Examples 12 to 15, a case in which an intermediate temperature and a retention time in the extreme cooling (second cooling) during operations deviate from the conditions proposed in the present disclosure. In the Comparative Examples 12 and 13, the $SSG_{M+B}$ phase having a sufficient fraction was not formed as the Relational Expression 3 is not satisfied as the retention time in the extreme slow cooling zone was controlled to 15 sec and 0 sec, respectively. In addition, in the Comparative Examples 14 and 15, since the cooling stop temperature of the first cooling was excessively high or excessively low, the intermediate temperature in the extreme slow cooling zone was controlled to be 785° C. or 525° C., respectively. Thus, the Relational Expression 3 was not satisfied such that the $SSG_{M+B}$ phase having a sufficient fraction was not formed.

In addition, Comparative Example 16 shows the case in which a cooling rate during the second cooling exceeds 2° C./s. In Comparative Example 16, the fraction of the bainite phase B was excessively formed at 30% or more, and the fraction of the $SSG_{M+B}$ phase was relatively small at 6%, and the difference in Vikers hardness between the weld heat affected zone and the base material after electric resistance welding was indicated to be 43, which is large.

While example embodiments have been shown and described above, it will be apparent to those skilled in the art that modifications and variations could be made without departing from the scope of the present inventive concept as defined by the appended claims.

The invention claimed is:

1. A hot rolled steel plate for an electric resistance welded steel pipe, the hot rolled steel plate consisting of:
   by wt %, carbon (C): 0.05 to 0.14%, silicon (Si): 0.1 to 1.0%, manganese (Mn): 0.8 to 1.8%, phosphorus (P): 0.001 to 0.02%, sulfur (S): 0.001 to 0.01%, aluminum (Al): 0.1 to 0.3%, chromium (Cr): 0.3 to 1.0%, titanium (Ti): 0.01 to 0.05%, niobium (Nb): 0.025% or less, vanadium (V): 0.035% or less, nitrogen (N): 0.001 to 0.01%, and the balance of iron (Fe) and inevitable impurities; and
   a microstructure comprising: a ferrite phase as a matrix phase, a martensite phase, a bainite phase, and a mixture phase composed of a martensite grain and a bainite grain formed inside the martensite grain, wherein the ferrite phase comprises: an area fraction of 60 to 85%,
   wherein Mn and Si satisfy the following Relational Expression 1, $$4<Mn/Si<12 \quad \text{[Relational Expression 1]}$$

where, Mn and Si refers to a weight content of each element, and
   wherein the microstructure satisfies the following Relational Expression 2, $$SSG_{M+B}/(M+B+SSG_{M+B})\geq 0.6 \quad \text{[Relational Expression 2]}$$

where M, B, and $SSG_{M+B}$ refer to an area fraction of the martensite phase, the bainite phase, and the mixture phase, respectively.

2. The hot rolled steel plate for an electric resistance welded steel pipe of claim 1, further comprising: a tensile strength of 590 MPa or more and a yield ratio (YR=YS/TS) of 0.8 or less.

3. The hot rolled steel plate for an electric resistance welded steel pipe of claim 1, wherein, when the hot rolled steel plate is welded by an electric resistance welding, a Vickers hardness difference (ΔHv) between a weld heat affected zone and a base material is 30 or less.

4. A manufacturing method of the hot rolled steel plate according to claim 1 for an electric resistance welded steel pipe having excellent weldability comprising steps of:
   reheating steel slab including by wt %: carbon (C): 0.05 to 0.14%, silicon (Si): 0.1 to 1.0%, manganese (Mn): 0.8 to 1.8%, phosphorus (P): 0.001 to 0.02%, sulfur (S): 0.001 to 0.01%, aluminum (Al): 0.1 to 0.3%, chromium (Cr): 0.3 to 1.0%, titanium (Ti): 0.01 to 0.05%, niobium (Nb): 0.025% or less, vanadium (V): 0.035% or less, nitrogen (N): 0.001 to 0.01%, and the balance of iron (Fe) and inevitable impurities, Mn and Si satisfying the following Relational Expression 1, to a temperature within a range of 1180 to 1300° C.;
   finish hot rolling the reheated steel slab at a temperature equal to or higher than Ar3 to manufacture a hot rolled steel plate;
   first cooling the hot rolled steel plate to a temperature within a range of 550 to 750° C. at a cooling rate of 20° C./s or higher;
   second cooling the hot rolled steel plate at a cooling rate of 0.05 to 2.0° C./s within a range satisfying the following Relational Expression 3 after the first cooling;
   third cooling the hot rolled steel plate at a cooling rate of 20° C./s or higher to a temperature within a range of room temperature to 400° C. after the second cooling; and
   coiling the hot rolled steel plate after the third cooling, $$4<Mn/Si<12 \quad \text{[Relational Expression 1]}$$

where, Mn and Si refer to a weight content of each element, $$|t-ta|\leq 2 \quad \text{[Relational Expression 3]}$$

(ta=252+(109[C])+(10.2[Mn])+(22.81[Cr])−(3.46[Si])−(5.41[Al])−(0.87Temp)+(0.00068Temp^2), where, t refers to a retention time (sec) of the second cooling (extreme slow cooling zone), ta refers to a retention time (sec) of the second cooling (extreme slow cooling zone) for securing an optimal phase fraction, and Temp refers to an intermediate temperature of the second cooling (extreme slow cooling zone), and a temperature at a middle point between a second cooling starting point and an stop point, where each alloy composition refers to a weight content.

5. The manufacturing method of a hot rolled steel plate for an electric resistance welded steel pipe having excellent weldability of claim 4, further comprising a step of pickling the coiled hot rolled steel plate and then greasing.

6. An electric resistance welded steel pipe manufactured by electric resistance welding the hot rolled steel plate of claim 1.

* * * * *